(12) United States Patent
Chao (10) Patent No.: US 11,197,036 B2
(45) Date of Patent: Dec. 7, 2021

(54) MULTIMEDIA STREAM ANALYSIS AND RETRIEVAL

(71) Applicant: Piksel, Inc., Wilmington, DE (US)

(72) Inventor: Gerald CheShun Chao, Los Angeles, CA (US)

(73) Assignee: PIKSEL, INC., Wilmington, DE (US)

( * ) Notice: Subject to any disclaimer, the term of this patent is extended or adjusted under 35 U.S.C. 154(b) by 29 days.

(21) Appl. No.: 16/608,730

(22) PCT Filed: Apr. 26, 2018

(86) PCT No.: PCT/EP2018/060795
§ 371 (c)(1),
(2) Date: Oct. 25, 2019

(87) PCT Pub. No.: WO2018/197639
PCT Pub. Date: Nov. 1, 2018

(65) Prior Publication Data
US 2020/0195983 A1   Jun. 18, 2020

Related U.S. Application Data

(60) Provisional application No. 62/490,305, filed on Apr. 26, 2017.

(51) Int. Cl.
*H04N 21/234* (2011.01)
*G06F 16/74* (2019.01)
*G06F 16/732* (2019.01)

(52) U.S. Cl.
CPC ... *H04N 21/23418* (2013.01); *G06F 16/7328* (2019.01); *G06F 16/745* (2019.01)

(58) Field of Classification Search
CPC ............ H04N 21/23418; G06F 16/745; G06F 16/7328
See application file for complete search history.

(56) References Cited

U.S. PATENT DOCUMENTS

| | | | |
|---|---|---|---|
| 2003/0081811 A1* | 5/2003 | Shimizu ................ | G06F 40/137 382/100 |
| 2003/0093790 A1* | 5/2003 | Logan .................... | G11B 27/34 725/38 |
| 2010/0158470 A1* | 6/2010 | Tzoukermann ......... | G06F 16/48 386/241 |
| 2013/0309986 A1* | 11/2013 | Cox ....................... | H04H 20/55 455/179.1 |
| 2015/0365716 A1* | 12/2015 | Fonseca, Jr. ........ | G06K 9/00751 725/41 |
| 2016/0014482 A1* | 1/2016 | Chen ................. | H04N 21/26258 386/241 |
| 2016/0098396 A1* | 4/2016 | Morton ................... | G06F 16/31 707/746 |
| 2019/0034528 A1* | 1/2019 | Lintz ..................... | G06F 16/745 |

OTHER PUBLICATIONS

International Search Report and Written Opinion, EPO, completed May 29, 2018, for application PCT/EP2018/060795.

* cited by examiner

*Primary Examiner* — Sumaiya A Chowdhury
(74) *Attorney, Agent, or Firm* — Holzer Patel Drennan (57) ABSTRACT

There is disclosed a method of processing a video stream, comprising: performing a content analysis of the video stream; identifying a transition from one segment to another segment in the video stream based on the content analysis; and marking a segment boundary corresponding to the identified transition.

20 Claims, 5 Drawing Sheets

MULTIMEDIA STREAM ANALYSIS AND RETRIEVAL

BACKGROUND OF THE INVENTION

Field of the Invention

The present disclosure relates to the analysis of multimedia streams, and particularly but not exclusively to any one of the segmentation of video content, the analysis of video content, or the search of video content in order to achieve improvements in a content retrieval and discovery system including but not limited to a content recommendation system.

Description of the Related Art

Television (TV) broadcast has traditionally been a mass medium, where a single video stream is delivered at the same time to a mass audience. While this is efficient from a delivery standpoint, the downside is that the consumption experience is the same across the mass audience, and in a linear manner with respect to time. With the advent of digital recorders and videos delivered over the internet, also known as internet protocol (IP) delivered video, the consumption model of TV content no longer necessitates this singular experience. Instead, each viewer is able to choose what video he/she likes when he/she wants it. However, more content availability also creates more decisions about what content to consume, and without an effective way to organize and navigate the content, the number of choices would simply become overwhelming. The provision of such content provides a random access consumption model.

Linear TV has traditionally been navigated via electronic programming guide, also known as "the grid", which is a list of show episodes organized by channels and time. Since both channels and time are no longer relevant in the random access consumption model, akin to hypertext made textual content randomly accessible and making printed form and page numbers obsolete, this old paradigm no longer makes sense.

Currently, there is some TV content that can be watched "on demand," composed of usually individual movies and TV shows, latter of which can be further accessed via episodes. Current methods for consuming non-linear TV operate at this level of granularity, i.e., by allowing viewers to select TV shows and individual episodes, and to encourage more consumption via search and recommendations of other TV shows deemed most related.

However, while the current methods work well for scripted content such as movies and dramas, they do not lend themselves well for non-fictional shows such as talk shows, reality shows, sports reports, cooking shows, etc., and do so poorly or not at all for news. However, since TV consumption is usually comprised of equal, or at least a significant portion of, non-fictional content, the need exists for enabling the easy discovery and navigation of both categories of TV content to make all of traditionally linear TV randomly accessible.

SUMMARY OF THE INVENTION

There is described a method for analyzing linear videos and splitting them into atomic units which may be called segments. In this way a single unit or component of a video stream is created. Such segments may consequently represent a unit of the stream which is semantically attributed to a theme.

These segments are analyzed for their contained subject matter to generate a semantic representation of the theme, or in other words of what the segment is about. For example, one segment may be about the latest trade negotiations, followed by the latest earnings report, and finally about the latest sports scores of the home teams. These segment representations then serve as the basis for navigating, searching, and recommending TV content in a nonlinear fashion. In doing so, TV viewers could begin their consumption experience in multiple ways to best suit their interests. For example, they can start by selecting segments from their favorite shows, then choose to watch other segments and episodes that are most similar. Alternatively, a viewer can choose from a watchlist of segments about their favorite celebrities and companies, or simply see a set of personalized recommendation of segments described technique subdivides linear TV into segments that are then dynamically connected to the most relevant segments viewers may like to consume next. In doing so, the present invention alleviates the burden of the viewers from the need to decide what to consume next.

A uniqueness of the described technique is the automatic identification of segment boundaries of linear videos based on content analysis. Traditionally this would be done manually, by having human editors watch and seek within linear videos for the start and end points of segments discussing a particular story. This process of clipping videos from linearly produced streams is labor intensive and has inherent delays, and therefore is not well suited for large number of streams or fast-moving news environments. In the described technique, an advantageous way to automate the process is set out, as well as providing a method to describe each identified segments for improving consumption and retrieval.

Once the segments are identified and descriptors extracted, a semantic vector is also generated to represent what the segment is about. The more accurate this step of summarizing a segment, the higher the quality of the resulting recommendations. In this step a novel technique for summarizing a given video segment is introduced to maximize the accuracy of this semantic vector representation.

There is also described the generation of search topics as part of the summarization process for each segment, in addition to the vectors. This is used for locating all segments about a topic such as a person or company. Further, it is used for efficiently retrieving related segments for an input segment, which would be very inefficient with existing techniques such as vector-based retrieval, since new segments are constantly being added and old ones deleted.

As a result, the described techniques are able to efficiently retrieve and compute the similarity to other segments via simple vector comparisons. This is opposed to using approaches such as keywords or editorial descriptors such as genres, which have many drawbacks compared to the described techniques. Therefore, there is described an efficient and high quality method for recommending other related video segments for a given segment, and thus enabling randomly accessible discovery of previously linear, non-randomly accessible videos.

The described technique may be considered as being composed of three phases:

A first phase is segment identification. A multi-modal analysis is used to extract information about the composition of the input video stream, including for example video analysis, image analysis, audio analysis, and textual analysis. The textual analysis may be the analysis of closed-captioned transcripts, subtitles, as well as transcripts from a speech-to-text conversion. The output of this component is to identify when the linear video has transitioned from one theme of discussion to another theme of discussion, and therefore the conclusion of the previous story as one segment and the start of a new one.

In a first aspect there is provided a method of processing a video stream, comprising: performing a content analysis of the video stream; identifying a transition from one segment to another segment in the video stream based on the content analysis; and marking a segment boundary corresponding to the identified transition.

The method may further comprise: determining a content analysis type to be applied to the video stream; performing the content analysis of the video stream based on that determination.

The content analysis may be at least one of a plurality of analysis modes. The plurality of analysis modes include: video analysis; image analysis; audio analysis; and textual analysis. Each analysis mode may affect the probability that a given moment in the video stream indicates a start of a new segment.

The likelihood of a new segment starting very shortly after determination of a previous segment may be low.

The content analysis may include a plurality of analysis modes, the method further comprising aggregating the applied analysis modes.

Identifying a transition from one segment to another segment may comprise assuming the input video stream comprises a linear sequence of segments.

Identifying a transition from one segment to another segment may comprise identifying a change in any one of the video, image, audio or text of the video stream.

The content analysis may include a textual analysis, and wherein for the textual analysis identifying a transition from one segment to another segment comprises identifying a start of sentences, and examining the sentences. Examining the sentences comprises comparing one sentence to another. Examining the sentences may comprise comparing each sentence to a previous sentence or a combination of previous sentences, in order to identify a transition from one segment to another segment.

The method may further comprise applying a score to the analysis of each sentence, denoting the likelihood that it is associated with the start of a new segment. The score may be dependent upon the number of sentences between the current sentence and the start of the segment, the greater the number of sentences the higher the probability of the sentence being associated with a new segment.

The scores may be modelled in order to determine the segment boundaries.

The transition from one segment to another segment may be based on identifying a transition from one theme to another theme. The content analysis may determine whether the theme of the video stream changes, and in dependence on selecting a change in themes a transition between segments is identified.

In this aspect there is also provided a device for processing a video stream, comprising: a content analysis module for performing a content analysis of the video stream; and a processing module configured to identify a transition from one segment to another segment in the video stream based on the content analysis, and mark a segment boundary corresponding to the identified transition.

A second phase is segment summarization. Once the segment boundaries are identified, all of the content analysis performed for the segment is combined to generate descriptors, including a list of most representative topics, a summary sentence describing the story being discussed, as well as a vector for representing the semantics of the segment.

In a second aspect there is provided a method of processing a video stream, comprising: identifying a plurality of boundaries within an input video stream; defining a segment between each consecutive boundary; applying content analysis to the entirety of the content of each segments; and generating a descriptor for each segment providing a summary of the segment.

The boundaries may be the start and end of a piece of video content, such that the segment may be the whole video stream.

The boundaries may be between the start and end of the video content, such that a segment may be a sub-set of the video stream.

The step of generating may generate multiple descriptors for each segment, the multiple descriptors providing the summary of each responding segment.

The multiple descriptors may comprise at least two of: a list of most representative topics for the segment; a summary sentence describing the story discussed in the segment; a vector representing semantics of the segment. The list of most representative topics may be determined by inferring a set of topics most relevant to the segment. The summary sentence may condense the segment into one descriptive sentence.

A descriptor may be a summary of topics of the segment.

The summary of topics may not be a keyword description or editorial description of the segment.

There may be provided a plurality of predetermined topics, the method comprising determining one or more topics with which the segment is most closely associated.

A descriptor may be one descriptive sentence of the segment based on the analysis. The step of generating one descriptive sentence may comprise selecting a sentence from the segment which captures the overall content of the segment.

Each sentence within the segment may be scored, and the sentence with the highest score is selected as the descriptive sentence.

The step of generating one descriptive sentence may comprise generating a sentence which paraphrases the overall content.

The step of generating one descriptive sentence may comprise utilising text provided with the video content.

If there is produced multiple sentences summarising the text provided with the video content, the sentences may be scored and the sentence having the highest score used.

In this aspect there is also provided a device for processing a video stream, comprising: a content analysis module configured to identify a plurality of boundaries within an input video stream, and define a segment between each consecutive boundary, and apply content analysis to the entirety of the content of each segment; and a processing module for generating a descriptor for each segment providing a summary of the segment.

A third phase is segment search and discovery. As part of the output from summarization, the topics are used for searching for other segments sharing these topics as the first step for finding related segments. The resulting segments of this search are then compared for similarity based on the vector representation to rank based on content similarity. In the non-fiction genres, content similarity serves as the primary factor for recommendations, with content recency (i.e., how recent the content is, or its freshness) and popularity as secondary factors.

In a third aspect there is provided a method of content recommendation, comprising: identifying a topic of interest to a user; searching a database of segments of content, the data base including a summary of the topics of each segment;

comparing the topic of interest to the user to the topics of each segment; providing recommendations to the user based on a match.

The topic may not be a keyword description or editorial description of the segment.

The method may further comprise: identifying a plurality of boundaries within a video stream; defining a segment between each consecutive boundary; applying content analysis to the entirety of the content of each segment; and generating a summary of the topics of the segment; storing the summary of the topics of the segment in the database.

In addition, the described techniques enable the same segments to be recommended not only based on content similarity, but also how similar the segments are to the segments a viewer has consumed in the past, i.e., personalized recommendations. For this use case, each viewer is represented as a list of segments he/she consumed in the past. These segments are then converted into a set of topics and vectors that represent the viewer's interests, extracted by the described techniques for each segment. To generate personalized recommendation for each viewer, the described techniques use the set of topics to query for new segments sharing the interests to that viewer, and then use the vector similarities to compute how similar each segment is to the historical interests of that user. These similarities act as the primary basis for ranking the recommendations, and secondary factors such as popularity and recency (or freshness) can be included to further improve the recommendation quality. The result is a list of segments ranked by the likelihood of the viewer watching each segment based on his/her consumption history.

Each summary may include a vector representation of each segment, the method further comprising: ranking the segments related to the user topic based on the vector representation of each of the related segments, wherein the step of providing recommendations is based on the ranking.

For non-fiction content, content similarity may be a primary factor for recommendations, and content recency and popularity are secondary factors for recommendations. The method may further comprise determining a similarity to segments the viewer has consumed in the past. Each segment the viewer consumed in the past may be converted into a set of topics and vectors, and then each segment the viewer consumed in the past may be compared and ranked.

The method may further comprise: accessing a plurality of summaries of segments previously recommended to the user; modifying the ranking in dependence on previously recommended segments; and recommending content to the user based on the modified ranking.

In this aspect there is also provided a device for processing a video stream, comprising: an input for receiving a topic of interest to a user; a database for storing segments of content, the database including a summary of the topics of each segment; a processor configured to compare the topics of interest to the user to the topics of each segment, and provide recommendations to the user based on a match.

Different segments of a video stream may be identified on the basis that the theme of the video stream changes from one segment to another. For any one of video analysis, image analysis, audio analysis or textual analysis applied to the video stream, the determination that is made to identify a potential segment transition, may be to identify a change of theme, respectively a change of video theme, a change of image theme, a change of audio theme, or a change of text theme. Regardless of the analysis applied, a change of theme based on that analysis may be utilized.

The first, second and third aspects may be combined in any combination, with all or part of any one aspect being combined with all or part of any other aspect.

BRIEF DESCRIPTION OF THE FIGURES

The invention is now described by way of example with reference to the accompanying Figures, in which.

DESCRIPTION OF PREFERRED EMBODIMENTS

In the following description various examples and embodiments are set out for illustration. In particular examples are set out in the context of particular types of content, but this is just for example and does not convey a limitation.

A system may be specifically engineered for segmentation for the challenge of automatically separating live, linear non-fiction broadcasts (e.g., news broadcasts) into discrete "segments", by way of identifying the transitions between the end of one subject-matter and the start of another subject matter. Furthermore, once a segment is identified, the entirety of the content within the segment may be analyzed to generate multiple descriptors to summarize what the segment is about. These descriptors may be used to improve the navigation, search, and consumption of segments, for example for the provision of recommendations.

The segmentation process is composed of two phases. The first phase is the identification of the segment boundaries, given the raw input video. This phase may be considered as segment generation or segment identification. Once the segment boundaries are found, the second phase is to generate the summary of the segment. This phase may be considered as segment content analysis or segment summarization.

It is worth noting that the second phase is not dependent on the first, in that an entire episode can be treated as a single segment and be summarized by the second phase, or if alternative methods for segmentation are available these segment boundaries can be used in lieu of the automatic segmentation from phase one. An alternative method for segmentation is disclosed in STCE-35, a standard. Segmentation may also be editorially selected.

It can also be noted that the first phase may have uses other than the second phase, and the first phase may be used irrespective of whether the second phase is used.

Thus whilst described examples combine these two phases, they can be separated and one does not require the other.

In the phase one analysis, for segment identification, an assumption may be made that there is a linear sequence of segments, and each one is distinct from the others.

Based on this assumption of a linear, discrete segment structure (e.g., for newscasts and talk shows), this segmentation task becomes the identification of n segment transition points, which can range from 1 to any number of segments per one hour (or in general, a given or predetermined time period) of broadcast. To find these n transitions, a second assumption may be made that segment transitions occur in between sentences. That is, it is assumed to be quite rare for a newscast to end one segment and transition to another in mid-sentence, and therefore only consideration of segment transitions at the start of sentences is needed.

The segmentation process then becomes a process of examining all sentences of an episode and computing a likelihood of each being a transition from one segment to another, in order to determine which sentences can be attributed as being the first sentence of segment boundaries. This likelihood may be a score.

That is, a probability estimation may be made for each sentence for its likelihood of being the start of a new segment, divided by the likelihood of it being not, i.e., being a part of a previous segment. These per-sentence probabilities may then be modeled, for example, as a hidden Markov process, and the traversal of the Markov chain that results in the maximum overall probability determines the segment boundaries. In an alternative the likelihood may be based on a subtraction rather than a division.

At the heart of this formulation is the accurate estimation for the likelihood of the current sentence being a segment transition or not. However, given the infinite compositional nature of human languages, each sentence can be an arbitrary combination of words and therefore the probability becomes incomputable. Therefore, a dimensionality reduction step is needed to compress the input sentences into a fixed-sized representation, and from these representations probability estimators can be trained from data to estimate the transition probabilities.

In a first step in this dimensionality reduction, a dictionary of words within a language are collected from a large training corpus, such as Wikipedia and historical news transcripts. A training corpus is a large body of text. These words are then converted into fixed-size vectors via neural networks to capture their distributional similarities within the corpus such that semantically similar words have more adjacent vectors, and semantically dissimilar words have distant vectors. These word vectors therefore capture how any given two words are related to each other semantically. Algorithms for computing these word vectors are well known and familiar to those skilled in the art.

The next step is converting the word vectors of a sentence into a single sentence vector, a step necessary to train the probability estimation model since sentences can be of arbitrary lengths, whereas the model requires a fixed input per sentence. There are multiple approaches for converting word vectors into sentence vectors, such as a similar neural network as the word vector model, LSTM (long short-term memory), and attention-based models. Given the potential real-time nature of news analysis, simpler and faster models are favored while maintaining good accuracy, over more complex and slower ones. Algorithms for converting word vectors into sentence vectors are well known and familiar to those skilled in the art.

Word vectors exist in one vector space where similar words are close to each other, and sentence vectors exist in a different vector space. They occupy different vector spaces.

Once the sentence vectors are computed, an estimation model for segment boundary probability is then trained using supervised methods, whereby the output label is the known boundary variable, true or false, and the inputs are the sentences and surrounding contextual sentences. Different machine learning models can be used for this estimator in order to accurately predict the likelihoods given the input sentence vectors, such as neural networks, SVMs, and others. Again, simpler and faster models are favored over more complex ones, with minimum loss in accuracy.

With an estimation model trained on the labeled corpus, the model is then used to compute boundary probabilities of new input videos. This process starts with converting the individual sentences from a new video into sentence vectors as described earlier, and along with the vectors from the contextual sentences, i.e., p preceding sentences leading up to the current one, are fed into the estimation model to calculate the probabilities of each sentence being a segment boundary or not. At the end of this process, there is identified n boundary probabilities, n being the number of sentences within for the episode.

For the final step of segment identification analysis, these n boundary probabilities are converted into s transitions, s being the number of final segments for the input video. As described earlier, an assumption is made that each segment has a discrete start and end point, and a new segment starts at the end of the previous segment. This linearization of segments is modeled, for example, as a hidden Markov process, where the probability of a state transition is probabilistically dependent upon the previous state.

If a sentence represents the first sentence of a new segment, the probability of the next sentence also being the start of a new segment is low. Conversely, if a sentence is a number of sentences away from the last segment boundary, then the probability of it being associated with a new segment is higher. Thus the closer a sentence is to the previous transition boundary the lower the probability it will be associated with a new segment, and conversely the further a new sentence is from the previous segment boundary the higher the probability it will be associated with a new segment. This is discussed in the context of textual analysis, and the analysis of sentences, but the principle may apply to any analysis, such as audio or facial recognition analysis.

The technique may compare a current sentence to: a previous sentence; one or more preceding sentences; an aggregate of a number of preceding sentences. For example, a newsreader might make a related point as a side note. This sentence may appear to be a totally different theme, and therefore be associated with a difference segment, if only the preceding sentence was considered.

This probability information may form part of the model used.

To model this Markov process, one can choose from multiple machine learning approaches for capturing sequential processes, such as hidden Markov models, recurrent neural networks, and LSTMs (long short-term memory). Training of these models are based on the same labeled training corpus as before, but instead of looking at individual sentences at a time by the segment boundary model, these sequence learning models are fed with the ordered input of events, which is the sequence of segment transition probabilities per sentence, and the supervised label for whether each sentence is at the actual segmentation boundary. The sequence learning models would then learn the transition probabilities to best predict the output given the history of the transition probabilities. At the end of this process, the sequence model would output the s transition points that maximize the overall segmentation probabilities of the input episode, via the Viterbi algorithm, beam search, or others. Algorithms for estimating transition probabilities and determining maximal traversals are well known and familiar to those skilled in the art.

Thus far the segmentation process example described only relies on the textual component of the newscast as input, such as from closed captioning or automatic speech recognition. However, in examples this automatic segmentation process can be further improved in terms of accuracy by incorporating data extracted from additional modalities of the input video. The most notable is for performing facial recognition of the news anchors, such that the presence of the news anchors would increase the likelihood of segment transition, and the opposite during absences. Similarly, image similarity between video frames would provide strong contextual cues for transition probabilities, in that large visual changes between frames would increase likelihood of segment transitions, whereas visually consistent spans would decrease the likelihood, except for the case of the anchors being on screen. Additionally, audio analysis can be used to identify regions of speech, music, sound effects, and silence, each would offer contextual inputs to the likelihood of time regions being segment boundaries. Furthermore, metadata that may be attached to the video, such as SCTE-35 for commercial timing signals, could be used to improve segmentation accuracy as well.

Thus facial recognition analysis, image analysis, audio analysis and metadata analysis are all candidates for potential additional analysis applied to a video in addition to textual analysis. Each type of analysis may be individually performed or also in combination with others, e.g., in addition to textual analysis In addition, any one of textual analysis, facial recognition analysis, image analysis, audio analysis and metadata analysis are all candidates for potential additional analysis applied to a video, and the textual analysis may not always be applied.

Thus sentence analysis may be used alone or in combination with other analysis techniques, or simply one or more alternative analysis techniques may be deployed. If video analysis is used to measure significant changes in the video, for example, such as a change from a newsreader to a video of a protest, this might be indicative of the start of a new segment or, if it occurs shortly after the start of a segment already, it may just be the newsreader introducing a story, showing some related footage, and continuing to talk over it.

As an example, imagine a user watching TV, and then going into another room to make a coffee. The user can still hear the TV. The user hears what he/she thinks is the jingle that plays when the advert break finishes (e.g. the channel ident music). The user therefore assumes the advert break has finished. However, if the user now immediately hears what sounds like another advert, the user confidence that this is an advert is low because the user knows the advert break has just finished. In the described techniques, if the system only recently determined the start of a new segment (by whatever means), the likelihood of a new segment starting very shortly after is low. The further from the beginning of the current segment, things suggestive of the start of a new segment are more likely to be accurate.

The big advantage of a segmentation engine as described is that additional content analysis data sources can be added into the model by simply adding them as inputs to the two likelihood estimators, i.e., the segment boundary probability and segment transition probability models. Since the supervised corpus provides the transition labels, the same machine learning models can incorporate additional contextual inputs to improve their estimation accuracies. It is conceivable that more complex models may be needed to better capture the expanded inputs, but that is as simple as training a new model using the same training data and swapping out the old. The rest of the segmentation pipeline would remain the same other than the improved segmentation accuracy.

Once the segment start and end points are determined using the above or different techniques, the second phase, referred to as segment summarization may be implemented.

Segment summarization may involve the condensing of the segment into one descriptive sentence. The descriptive sentence is similar to a title for a news article, such that a viewer can get a quick understanding of what a segment is about.

Segment summarization may involve extracting a set of topics most relevant to the segment. The descriptive set of topics can be used for a viewer to also get a quick understanding of what a segment is about. More importantly, the extracted set of topics can be used for identifying segments pertaining to certain topics, such as "North Korea" or "immigration reform", and retrieving them in a search process. This is an improvement over keyword search of the closed captioning transcript, since these topics are central to each segment and not casual mentions. In selecting only the most relevant topics per segment, this ensures that the search results for segments about each topic is of the highest relevance.

The segment summarization phase is also carried out in multiple steps, all built upon the same word vectors used in the segmentation phase. The first step is to compute the relative importance of all the words and phrases within the segments. This importance is composed of two primary factors, the number of occurrences of each topic, and its semantic distance to the overall segment.

To ensure the most accurate counting of each topic, natural language processing techniques are applied to normalize syntactic variations. Then deduplication is applied to each topic to merge lexical variations such as capitalization, pluralization, adjectival versions of nouns, etc. This is done via semantic similarities of the word vectors and not by a traditional lemmatization process, since lemmatization is non-contextual and therefore can collapse semantically different words into one form, such as combining gerunds with its verb counterparts. Optionally, pronouns are resolved to their referents to correctly count the number of times each topic was discussed even if they are referenced indirectly. Algorithms for performing these natural language processing steps are well known and familiar to those skilled in the art.

Once the topics are normalized and counted, their vectors are combined into a single segment vector as if they were part of a single long sentence. This segment vector provides a semantic centroid for computing the distance between each topic to this centroid, thus quantifying its relatedness to the segment. Sentences are compared to each other by looking at the distance between their vector representations. As stated above, the sentence vector space is different from the word vector space, so there is no confusion of comparing a word to a sentence. The distance score per topic is then combined with its occurrence count that's been normalized into frequencies into a single score. Intuitively, for each topic, the higher the semantic relatedness to the segment centroid and the higher the count, the higher the score for that topic. Therefore, at the end of this stage, a ranked list of topics and their associated relevancy scores is generated per segment.

This topic ranking and election process can be further refined by more iterations of computing an updated segment centroid based on the updated weights per topic, which in turn would refine the semantic distance calculations between each topic and this new centroid. This process can repeat until these ranked topics stop changing, or the centroids between iterations stop changing by some distance threshold, i.e., until it converges.

Once the ranked list of topics is computed, the next stage is to generate the summary for the segment. There are two ways for automatic summary generation, extractive and abstractive. Extractive is the process of selecting a sentence from the document that best captures the overall content, analogous to snippets extracted from web documents within search engine results, whereas abstractive aims to generate new sentences that paraphrase the essence of the original document. An extractive method may be used, whereby each sentence within the segment is scored based on its semantic distance to the segment centroid, using the weighted topic vectors from the previous stage. For selecting one most representative sentence, the topics that occur in each are simply tallied by their scores, and normalized by number of topics in the sentence. The result is that the sentence that results the highest topic score becomes the representative one that best captures what the segment is about.

In addition to this extractive summarization, more analysis can be used to generate summary sentences. One approach is convert on-screen graphics displayed alongside the newscasts, often rendered on the lower-third of the screen, into text via optical character recognition. Since these texts are editorially written to describe the subject matter at that moment in time, they represent authoritative summaries. In the task of selecting a segment summary, however, there can be multiple on-screen texts that were displayed on-screen during a segment. In this scenario, the same ranking process is used to score each on-screen text for its topical relatedness to the segment and the highest scored one is chosen.

At the end of both phases of this segmentation analysis, an input episode is then converted into discrete segments spanning the duration of the episode, and for each segment, metadata in the form of a summary sentence and ranked list of most relevant topics are generated.

Figure 1:
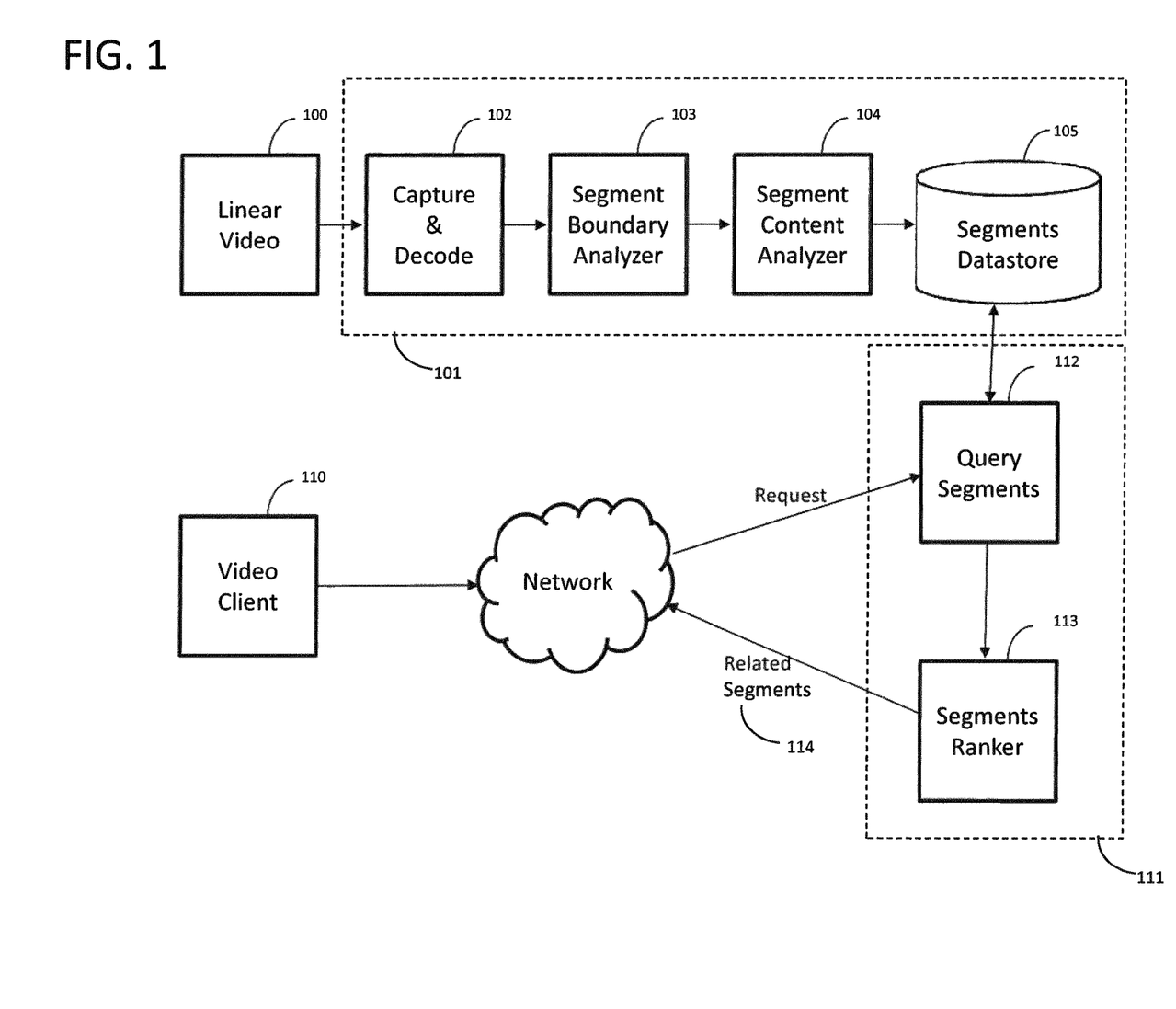
FIG. 1 illustrates an architecture of a system in which described examples may be implemented.

FIG. 1 illustrates in schematic form an architecture for processing information in accordance with described examples. As will be described in more detail below, some of the structures and functions illustrated in FIG. 1 represent optional functionality that need not be present in all implementations.

The architecture of FIG. 1 comprises an analysis system 101, a server component 111, and a network. Also shown in FIG. 1 is a block 100 representing linear video content, and a block 110 representing a video client.

The inputs to the system are videos in linear format, as denoted by block 100, and optionally associated metadata about the video, such as the title, synopsis, cast, etc. These videos provide inputs to analysis system 101 in a variety of ways, such as via a capture device off of broadcast streams, IP-delivered streams, or file uploads of the digital video. As long as the video data can be received and digitally decoded into individual video frames once it enters the system, the mechanisms of the video delivery is not important.

The analysis system 101 comprises a capture and decode block 102, a segment boundary analyzer 103, a segment content analyzer 104, and a segments data store 105.

As mentioned above, the capture and decode module 102 captures and digitally decodes the linear video input to the analysis system 101, and provides it to the segment boundary analyzer 103.

The decoded video is then optionally analyzed for segment boundaries in the segment boundary analyzer 103, in order to divide the video into segments. Segments are the smallest units of content that viewers would likely consume. That is, the criteria for determining a segment's boundaries is based on the likelihood that it will be consumed in its entirety, and segments can either be defined as part of the metadata of the video or automatically determined. For fictional works, a segment is likely the entire episode or movie. For talk shows, the video may be segmented by the guests. For news, the video may be segmented by the coverage of a single story or event. Therefore, this segmentation process is dependent on the type of TV show, as well as the analysis of the content within the show for its composition to determine the segment boundaries.

An implementation of the segment boundary analyzer is described in more detail with reference to FIG. 2 and FIG. 3.

Once the segments are determined from the linear video stream, they each become a new atomic unit, i.e., a segment, of video content within the system. The segmented video is provided to the segment content analyzer 104. The segment content analyzer 104 automatically generates a semantic representation of what the segment is about. The results of the segment content analyzer are then saved into the segment data store 105.

Since the linear video is often broadcast live, the described examples provide for an automatic method of generating a semantic vector per segment, as well choosing search topics that summarizes the segment content to enable subsequent efficient retrieval and similarity comparisons.

A user may request related segments via the video client 110. The request from the video client 110 is delivered via the network to the server component 111.

The server component 111 comprises a query segments module 112 and a segments ranker 113.

The server component 111 processes the request by first having the query segment component 112 retrieves a list of matching segments from the segment data store 105 via search topics. This list of segments is then processed by the segments ranker 113 to remove duplicates and rank the segments based on a combination of relevance, recency, and popularity to generate a ranked list of most related segments 114.

These segments are then returned to the video client 110 for the users to consume.

Figure 2:
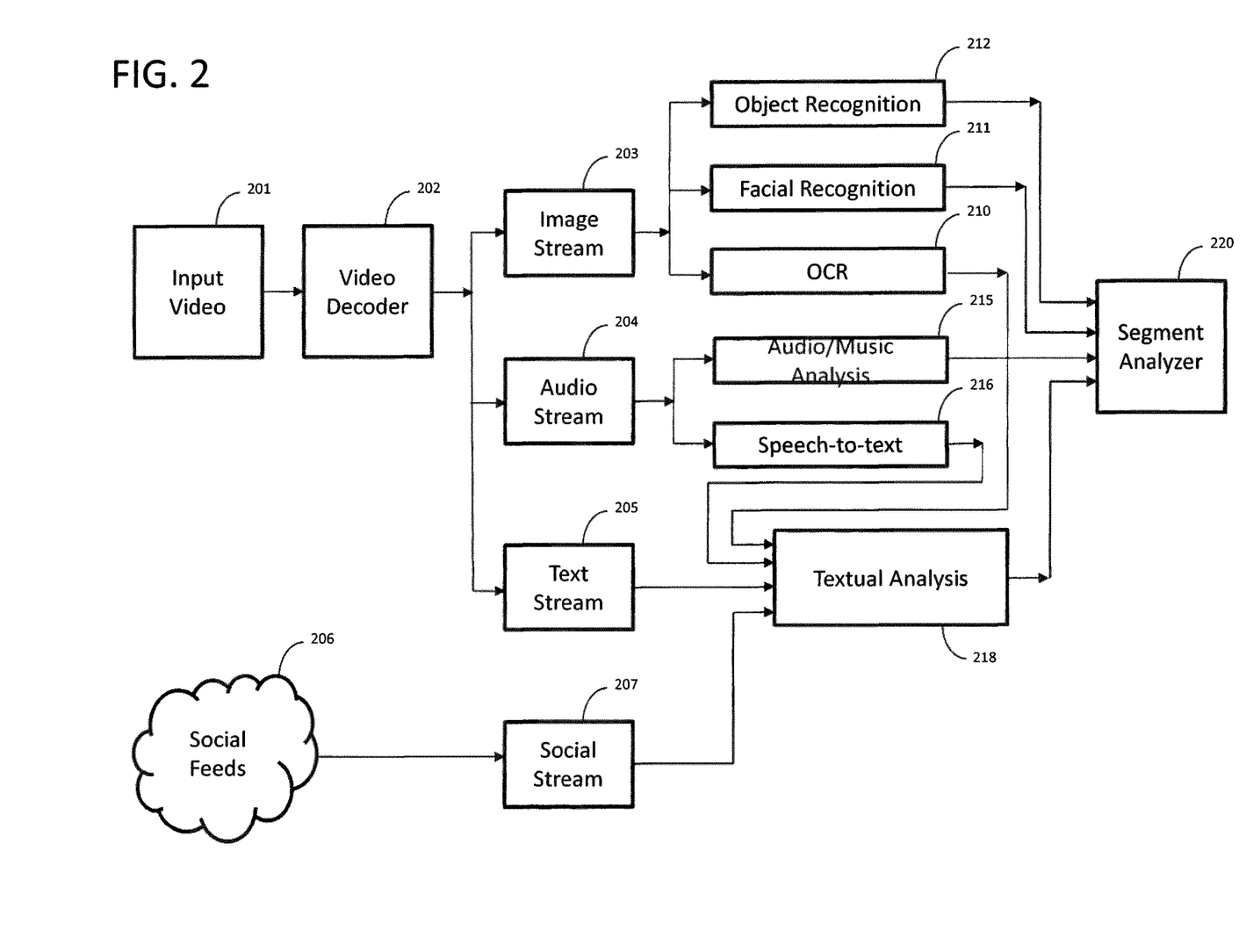
FIG. 2 illustrates an example implementation of an architecture for analyzing multimedia content.

FIG. 2 illustrates in schematic form a detailed example of the manner in which a video segment is analyzed in accordance with the invention. FIG. 2 can be understood as an example implementation of the segment content analyzer of FIG. 1.

A novel approach of the described examples is the use of multi-modal analysis of a video segment to generate a semantic representation of the content of the segment, with two specific outputs to optimize for. The first is a semantic vector representing what the segment is about, such that the more similar two segments are in their composition, the closer the distance is between their vectors. Conversely, the more dissimilar two segments are, the farther the distance. The second is the extraction of search topics, such that the more similar two segments are, the more overlap there is between their search topics. Conversely, the less similar the two segments, the fewer or no overlap of these search topics should occur.

As shown in FIG. 2, the example architecture of the segment boundary analyzer 103 comprises a video decoder 202, an image stream module 203, an audio steam module 204, a text stream module 205, an object recognition module 212, a facial recognition module 211, an OCR module 210, an audio/music analysis module 215, a speech-to-text module 216, a textual analysis module 218, a semantic summary generator 220, and social stream module 207. Also shown in FIG. 2 is a reference numeral denoting social feeds 206.

The process beings with the input video being decoded by the video decoder 202, which decompresses the video into three data streams: an image stream 203, an audio stream 204 and a text stream 205. Each of these streams is transmitted from the video decoder to a respective one of the image stream module 203, the audio stream module 204, and the text stream module 205.

Optionally, for videos with known feeds from social networking services 206, they can be retrieved as a social stream to the social stream module 207, and providing as an input for processing. This social stream will be composed of viewers discussing this video on social media.

The output of the image stream module 203 may be processed by multiple modules to extract information from the visual component of the stream. In this example, the output of the image stream module 203 provides an input to: the optical character recognition (OCR) module 210 to recover any textual content from the images, such as on-screen text, signage, etc.; the facial recognition module 211 to identify the people appearing in the video frames; and the object recognition module 212 to identify objects such as logos, animals, vehicles, etc., that appear in the frames. Other image analysis modules can be added to extract additional image-based data, such as color, histograms, textures, etc.

The output of the audio stream module 204 may be processed by multiple modules to extract information from the audio component of the stream. In this example, output of the audio stream module 204 provides an input to: the speech-to-text module 216 to convert any speech into text; and the audio/music analysis module 215 to recognize any music that appears in the video, such as songs and compositions. Other audio analysis modules can be added to extract additional audio-based data, such as volume, spectral energy, frequency components, etc.

The text stream module 205, if available, receives the text stream, which usually contains the transcript of the video. This textual data from the text stream module 205, alongside other textual streams from the OCR module 210, the speech-to-text module 216, and the social stream module 207, provide inputs to and is processed by the textual analysis module 218. Thus the textual analysis module 218 receives as inputs the outputs of modules 210, 216, 205, and 207. This analysis module 218 performs natural language processing (NLP) to extract semantic information from the input text, such as part-of-speech, named entities, and syntactic dependencies.

Figure 3:
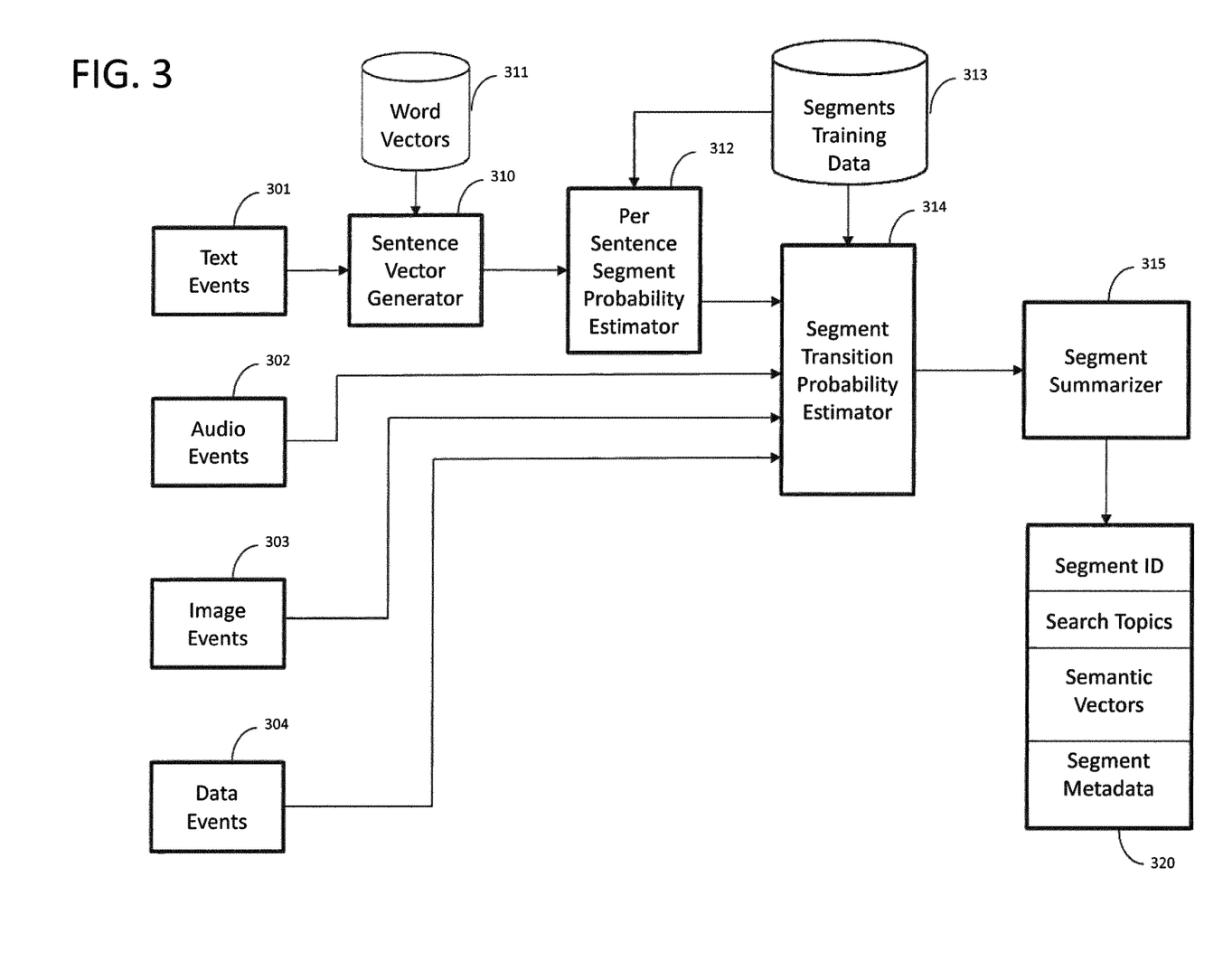
FIG. 3 illustrates an example implementation of an architecture for segmenting multimedia content.

All of the extracted data streams are sent to the segment analyzer 220, which is described in more detail in FIG. 3. Thus the outputs of each of modules 212, 211, 210, 215, and 218 are input to the segment analyzer 220.

With reference to FIG. 3, there is illustrated an example architecture for determining the segment boundaries and summaries. FIG. 3 is an example implementation of the segment boundary analyzer 103 and content analyzer 104 of FIG. 1.

The architecture comprises a text events module 301, an audio events module 302, an image events module 303, a data events module 304, a sentence vector generation module 310, a word vectors data store 311, a per sentence segment probability estimator 312, a segments training data store 313, a segment transition probability estimator 314, and a segment summarizer 315. Also shown is a summarized segment 320 output by the segment summarizer 315 that is stored in the segment data store 105.

Each of the text events module 301, the audio events module 302, and the image events module 303 may receive an input from ones of the modules 212, 211, 210, 215, and 218 of FIG. 2. The data events module 304 may be used to receive any events which cannot be associated with either text, audio or image, such as SCTE-35 events.

The text events module 301 provides an input to the sentence vector generator 310, which also receives an input from the word vectors store 311. The word vectors store 311 maps from individual words and phrases to their respective word vectors, trained via a text corpus as described previously. The sentence vector generator generates vectors for each sentence based on these word vectors.

The output of the sentence vector generator 310 forms an input to the segment probability estimator 312. During the training phase, it also receives as an input the segments training data 313 to train its estimation of the segment probabilities given the input sentence vectors. During the prediction phase, only the output from sentence vector generator 310 is used to generate the per sentence segment probabilities.

The segment transitions probability estimator 314 receives as inputs the per sentence segment probability estimator 312, the audio events module 302, the image events module 303, and the data events module 304. During the training phase, it also receives input from the segment training data 313 to train its estimation of transition probabilities.

The segment transition probability estimator provides an output in the form of start and end sentences for each of the segments detected within the input video. This can be implemented using a hidden Markov process, recurrent neural networks, and others. The decision of which method to use is up to the implementer. These segment boundaries are then provided to the segment summarizer 315.

The output of the segment summarizer 315 is a data structure, which may be termed a summarized segment, which is denoted in FIG. 3 by reference numeral 320. The summarized segment 320 represents the semantics of the segment of the video input, including the segment identifier (ID), the search topics of the segment, the semantic vectors of the segment, and any additional metadata descriptors of the segment, such as duration, show and episode of the original video, etc. This data structure is saved into the segment data store 105 of FIG. 1 for subsequent querying.

The set of search topics can be generated by a variety of methods, one of which is to select the most frequently occurring topics from the text data stream. Another approach is to discount each topic by its overall occurrences via techniques such as TF-IDF (term frequency-inverse document frequency) to remove overly common ones. A more complex approach is to perform clustering analysis of the semantic vectors of the topics to find groupings of topics that are semantically close, such as politicians or cooking ingredients or athletes. The decision of which method to use is up to the implementer, as long as the output topics sufficiently capture the most important ones covered within the segment.

The semantic vectors that underlies the described technique can also be generated by multiple methods. The simplest method is to take the semantic vectors of the individual search topics, which are trained previously on large textual corpus, and average the vectors into a single vector representation of the segment. The downside of this approach is the dependence on the quality of the search topics in representing the segment, as well as the errors introduced by averaging across the vectors. A better approach is to generate this semantic vector via a training algorithm, which takes the individual word vectors and instead of averaging, apply machine learning algorithms such as deep learning to adjust the vector to minimize error. This technique has shown to be effective at capturing the semantics of a block of text, with specific metric of similarity comparison to other vectors. The decision of which method to use is up to the implementer, the main tradeoff being complexity and accuracy of the vectors capturing the semantics of the segments.

It should be noted that the video segments are generated by the process of FIG. 3 in its entirety. However, examples are not limited to the segmentation process followed by the content analysis process. Either process may be implemented independently, and the content analysis process is not dependent on the described segmentation process.

Figure 4:
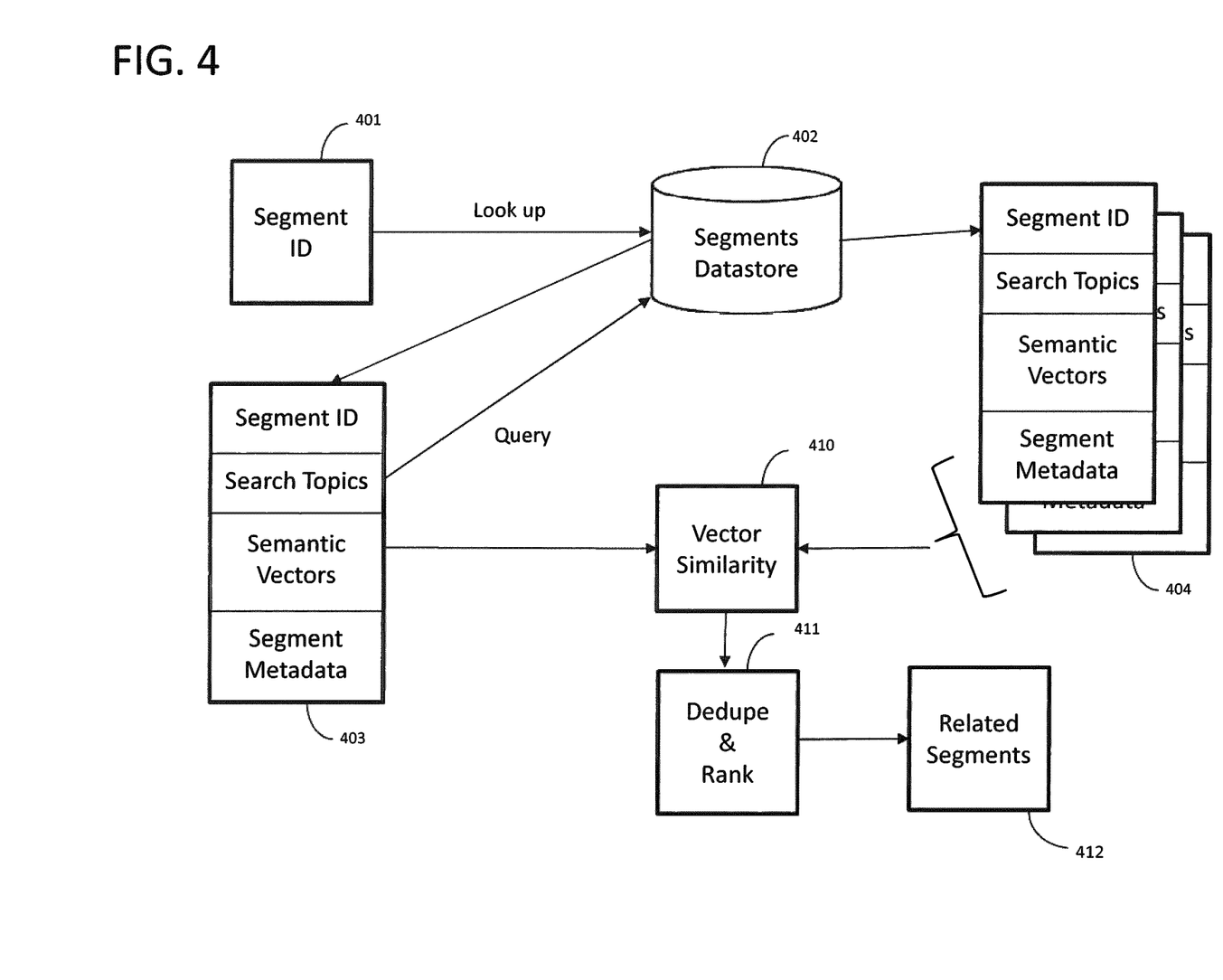
FIG. 4 illustrates an example of implementation of an architecture for recommending segmented multimedia content.

FIG. 4 illustrates in schematic form the manner in which related segments are generated in relation to an input segment requested by a user in accordance with the invention.

Shown in FIG. 4 is a block 401 representing a segment identifier (ID), a segments data store 402 (corresponding to the segments data store 205 of FIG. 1), a vector similarity module 410, a dedupe and rank module 411, and a relate segments module 412. Also shown in FIG. 4 is a segment summary 403, and a set of segment summaries 404.

The input to the related segments process begins with the identifier of the input segment, segment ID 401, for which the user is interested in finding additional related segments. This segment ID references the segment summary 403 in the segment data store 402 that was previously analyzed by the segment content analyzer 104. The search topics from this segment summary 403 are used to query the segment data store 402 for additional segments containing those topics, which results in the data store 402 returning the set of matched segments 404.

Among these matched segments 404, the next step aims to rank them based on how related each is to the input segment 403. This is accomplished by comparing the segment semantic vector of the input segment 403, which is part of the segment summary retrieved from the segment data store, to the other semantic vectors from each of the matched segments in the set 404. This vector similarity is computed by the vector similarity module 410 via a vector distance computation, such as cosine distance, to generate a semantic distance score between the input segment to each of the matched segments.

These scores are fed to the dedupe and rank module 411, which first remove exact duplicates and near duplicates based on the similarity scores. After duplicate removal, this module then ranks the remaining matched segments based on a combination of the distance score, recency, popularity, and other metrics, to compute the final score for each matched segment 404. The final result is a list of matched segments with the highest scores, which are deemed as the most related segments and produced by the related segments module 412.

Figure 5:
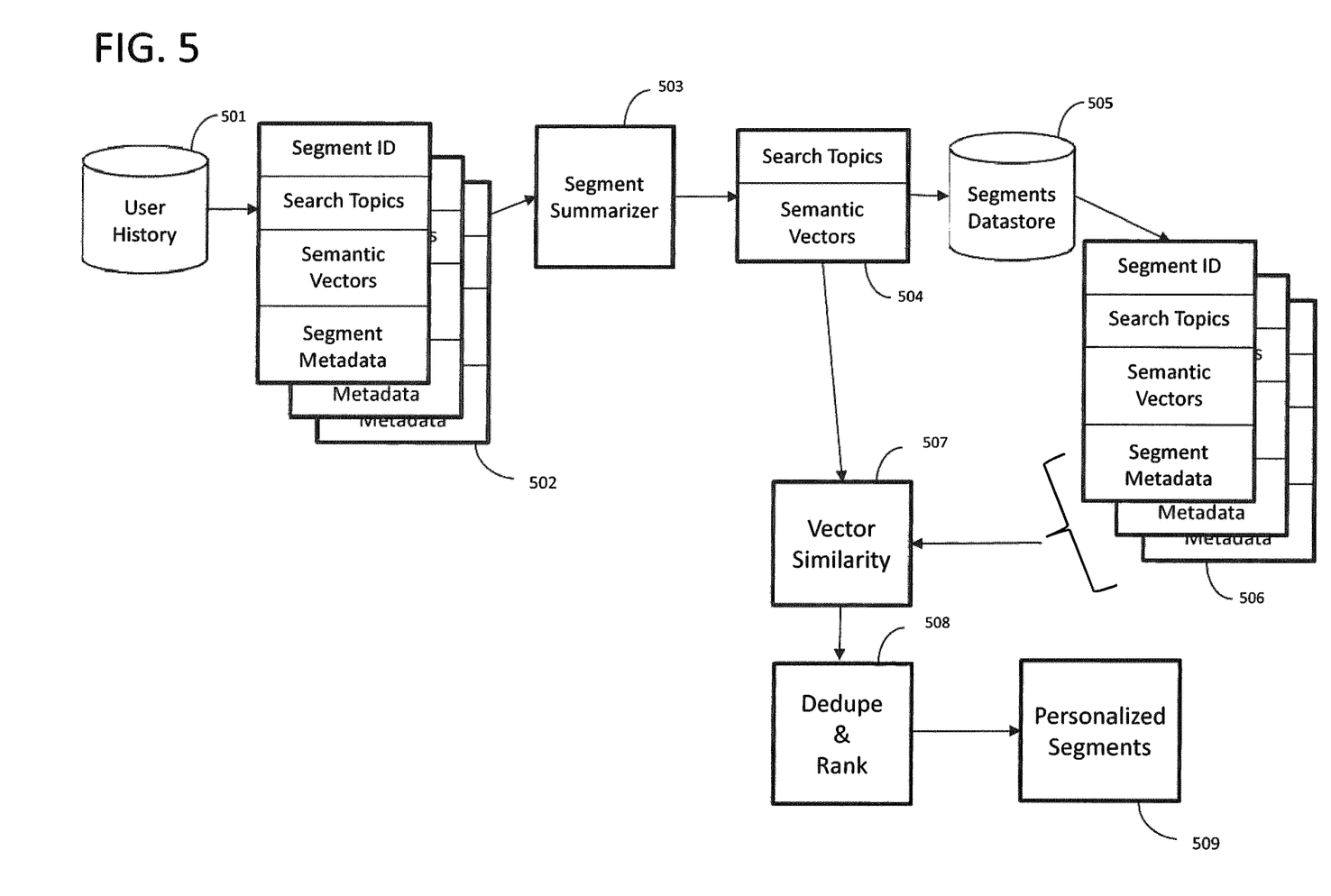
FIG. 5 illustrates an example of implementation of an architecture for recommending segmented multimedia content based on previously watched content.

FIG. 5 illustrates in schematic form an architecture which supports the generation of segments most relevant to individual users in accordance with the invention.

The input to this process is from a user history data store 501. The data store 501 stores the segments each individual user has watched in the past. For each user with historical data within the data store 501, a set of previously watched segments 502 is retrieved to provide context for the user's preferences. Reference numeral 502 denotes an example of retrieval of three watched segments for a particular user.

These watched segments are fed into a segments summarizer module 503, which analyzes the watched segments 502 to compute a representation that summarizes the segments this user has watched in the past, called a summary segment. This segment summarizer module 503 can compute this summary in a variety of ways. One way is by counting the number of occurrences of each search topic and averaging the semantic vectors across the watched segments. An alternate way is a weighted scoring of the topics via TF-IDF, k-means clustering, or semantic clustering via word embedding distance to generate the summary vector. The specific method is up to the implementer, as long as it is able to capture the search topics that best summarizes the segments that user watched in the past.

The summary segment 504 computed by the segment summarizer module 503 serves effectively as the input segment for computing the related segment as described previously. Namely, the search topics are used to query the segment datastore 505 (corresponding to the data store 105 of FIG. 1). The matched segments retrieved from the datastore, denoted by reference numeral 506, are compared to the summary segment for their semantic distances via vector similarity computation module 507. These distances are fed into a duplicate removal and ranking module 508 to generate the final score for each matched segment.

A final output is the personalized segments 509 most relevant for the user. One might observe that this process is effectively creating a summary segment based on a user's history, and then re-using the same components to generate a list of related segments that are most similar to what was consumed in the past. One enhancement over the related segments process would be to incorporate an additional metric to the ranking module, whereby each matched segment is compared to the historical segment's semantic vector individually, instead of one from the summary segment. This would further improve the semantic distance calculation to account for any information loss that's incurred during the generation of summary segment.

The segmentation process is generally applicable to broadcasts that have ended, so that the segmentation can be based on a self-contained set of data. However the segmentation process may also be implemented in a "real-time environment". Thus it can be applied to broadcasts that are still on air, combined with an on-going segmentation process.

There has been described a first technique for identifying a transition between segments of a stream, and marking segment boundaries between such transitions.

There has also been described a second technique for applying content analysis to a segment defined between consecutive transitions and generating a descriptor in dependence thereon.

The first and second techniques may be implemented separately or together. The first/second techniques may be combined with any and all aspects of second/first techniques as described.

There has been described a third technique for recommending content, in which topics associated with segments are used to fulfil a request for content relating to a particular content. This third technique may be implemented independently of the first and second technique, or may utilise either or both of the first and second techniques. For example the third technique may utilise the first technique to identify segments, and/or the third technique may utilise the second technique to analyse segments. The third technique may be combined with any and all aspects of the first and/or second techniques as described.

The techniques described may be implemented as processes in software. Software for performing the techniques may be stored on or accessible to any device, being a computing device or otherwise, associated with a content recommendation system. Software for performing the techniques may be stored on a computer program product such as a memory device.

The techniques described may be implemented in a server component of a content recommendation system.

Various examples are described herein. The invention may comprise elements of any one of the examples, either taken alone or in combination. The invention is not limited to the combination of features presented in any example, and individual elements of any example may comprise an invention either alone or in combination with another individual element or elements of any example.

The invention claimed is:

1. A method of processing a video stream to determine segment boundaries in the video stream, comprising:
    performing a content analysis of the video stream, comprising:
        for a plurality of parts of the video stream, determining a probability that each part represents the start of a new segment;
        for the plurality of parts of the video stream, adjusting the probability in dependence on a proximity in time of each part to a last identified segment boundary;
    identifying a transition from one segment to another segment in the video stream based on the content analysis; and
    marking a segment boundary corresponding to the identified transition.

2. The method of claim 1 further comprising:
    determining a content analysis to be applied to the video stream;
    performing the content analysis of the video stream based on that determination.

3. The method of claim 2 wherein the content analysis includes a plurality of analysis modes, the method further comprising:
    aggregating the analysis modes.

4. The method of claim 1 wherein the content analysis is at least one of a plurality of analysis modes.

5. The method of claim 4 wherein the plurality of analysis modes include: video analysis; image analysis; audio analysis; and textual analysis.

6. The method of claim 5 wherein identifying a transition from one segment to another segment comprises identifying a change in any one of video, image, audio, and text of the video stream.

7. The method of claim 4 wherein each analysis mode affects a probability that a given moment in the video stream indicates a start of a new segment.

8. The method of claim 1, wherein the step of adjusting the probability in dependence on the proximity in time of each part to the last identified segment boundary comprises: increasing the probability the further in time the part of the video stream is from the last identified segment boundary.

9. The method of claim 1 wherein identifying a transition from one segment to another segment comprises assuming the video stream comprises a linear sequence of segments.

10. The method of claim 1 wherein the content analysis includes a textual analysis, and wherein for the textual analysis identifying a transition from one segment to another segment comprises identifying a start of sentences, and examining the sentences.

11. The method of claim 10 wherein examining the sentences comprises comparing one sentence to another.

12. The method of claim 10 wherein examining the sentences comprises comparing each sentence to one of a previous sentence and a combination of previous sentences, in order to identify a transition from one segment to another segment.

13. The method of claim 10, further comprising:
    applying a score to an analysis of each sentence, the score denoting a likelihood that each sentence is associated with the start of a new segment.

14. The method of claim 13, wherein the score is dependent upon a number of sentences between a current sentence and a start of the new segment, a greater number of sentences resulting in a higher probability that the current sentence is associated with a new segment.

15. The method of claim 13 further comprising:
    modelling the scores in order to determine segment boundaries.

16. The method of claim 1 wherein the transition from one segment to another segment is based on identifying a transition from one theme to another theme.

17. The method of claim 16 wherein the content analysis determines whether a theme of the video stream changes, and in dependence on selecting a change in themes, a transition between segments is identified.

18. The method of claim 1, further comprising:
    applying the content analysis to an entirety of content of each segment; and
    generating a descriptor for each segment providing a summary of the segment.

19. The method of claim 1, further comprising:
    identifying a topic of interest to a user;
    searching a database of segments of content, the data base including a summary of topics of each segment;
    comparing the topic of interest to the user to the topics of each segment;
    providing recommendations to the user based on a match.

20. A device for processing a video stream to determine segment boundaries, comprising:
    a content analysis module for performing a content analysis of the video stream stored and performed on a memory device, and configured to:
        determine a probability, for a plurality of parts of the video stream, that each part represents the start of a new segment; and
        adjust the determined probability, for each of the plurality of parts of the video stream, in dependence on a proximity in time of each part to a last identified segment boundary; and
    a processing module stored and performed on the memory device and configured to identify a transition from one segment to another segment in the video stream based on the content analysis, and mark a segment boundary corresponding to the identified transition.

\* \* \* \* \*